FIG. 1

INVENTOR.
ISAAC L. WILCOX.
BY
D. Emmett Thompson
HIS ATTORNEY.

INVENTOR.
ISAAC L. WILCOX.
BY
D. Emmett Thompson
HIS ATTORNEY.

INVENTOR.
ISAAC L. WILCOX.

United States Patent Office 3,437,544
Patented Apr. 8, 1969

3,437,544
TAPE HANDLE APPLYING MACHINE
Isaac L. Wilcox, Fulton, N.Y., assignor to Phillips
Petroleum Company, a corporation of Delaware
Filed June 8, 1964, Ser. No. 373,402
Int. Cl. B26d 5/08; B32b 31/18
U.S. Cl. 156—354                                    7 Claims

ABSTRACT OF THE DISCLOSURE

A pair of containers are moved by a pusher from an infeed conveyor onto a stationary plate, the containers abutting against a second pair positioned on a constantly running outfeed conveyor and restrained from movement thereon by stop members, a handle band of heat sealable sheet material is secured to the first pair of containers whereupon the second pair are released for advancement by the outfeed conveyor, a succeeding pair of containers are pushed on the plate, pushing the first pair onto the outfeed conveyor, means is provided for perforating the handle band intermediate its edges.

---

This invention relates to a machine for applying a handle band of thin sheet material to a pair of containers, rectangular in cross section and arranged in upstanding abutting relation.

More particularly, this invention has to do with improvements in the machine disclosed in Patent No. 3,306,802.

This invention has as an object a machine for heat-sealing handle bands to pairs of containers and embodying a structure which functions at high speed, whereby the output of the machine is greatly in excess of that of prior machines of this type.

The invention also has as a further object a machine of the type described embodying mechanism which functions more efficiently in the handling of the film from which the handle bands are formed, and in the application of the handle bands to the containers.

The invention consists in the novel features and in the combinations and constructions hereinafter set forth and claimed.

In describing this invention, reference is had to the accompanying drawings in which like characters designate corresponding parts in all the views.

Figure 1:
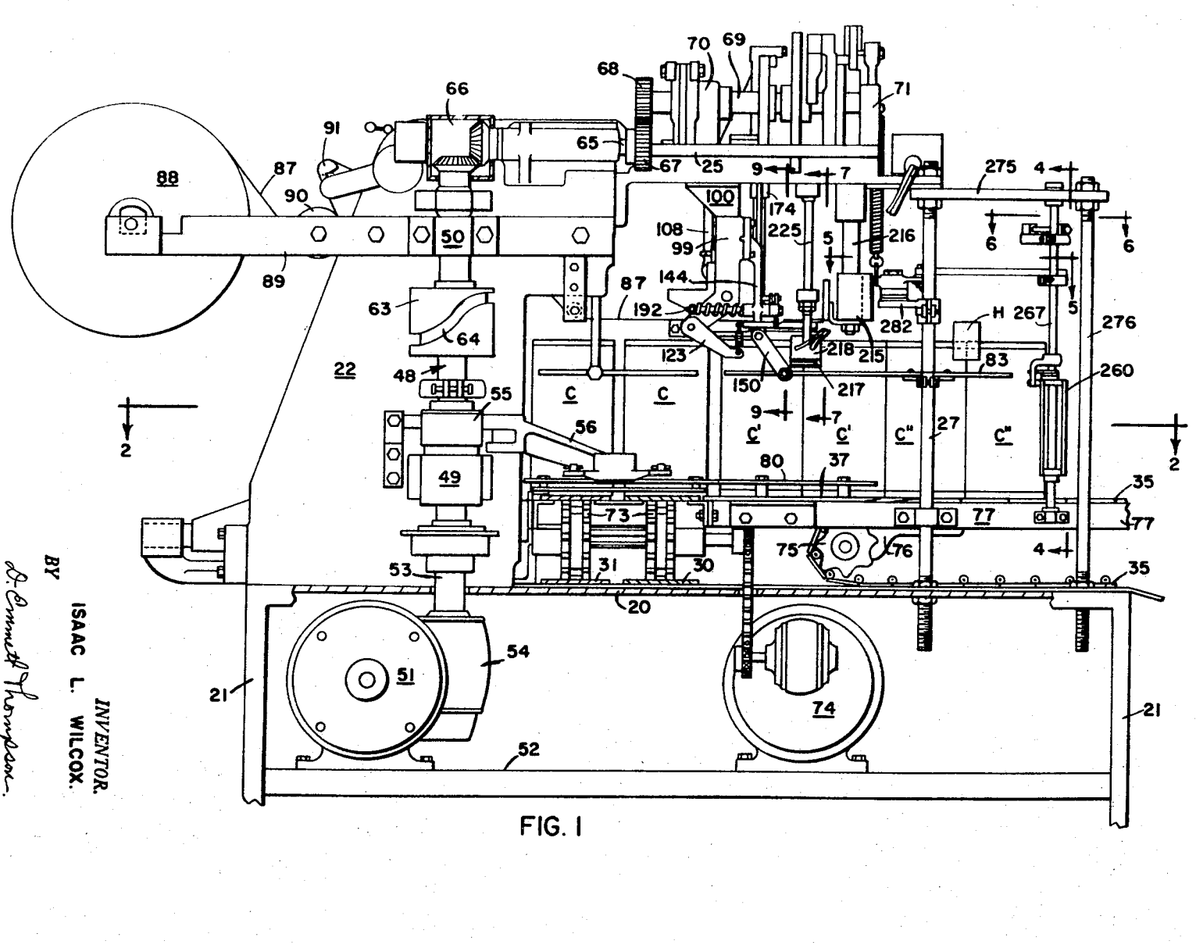
FIGURE 1 is a side elevational view of a machine embodying my invention.
Figure 2:
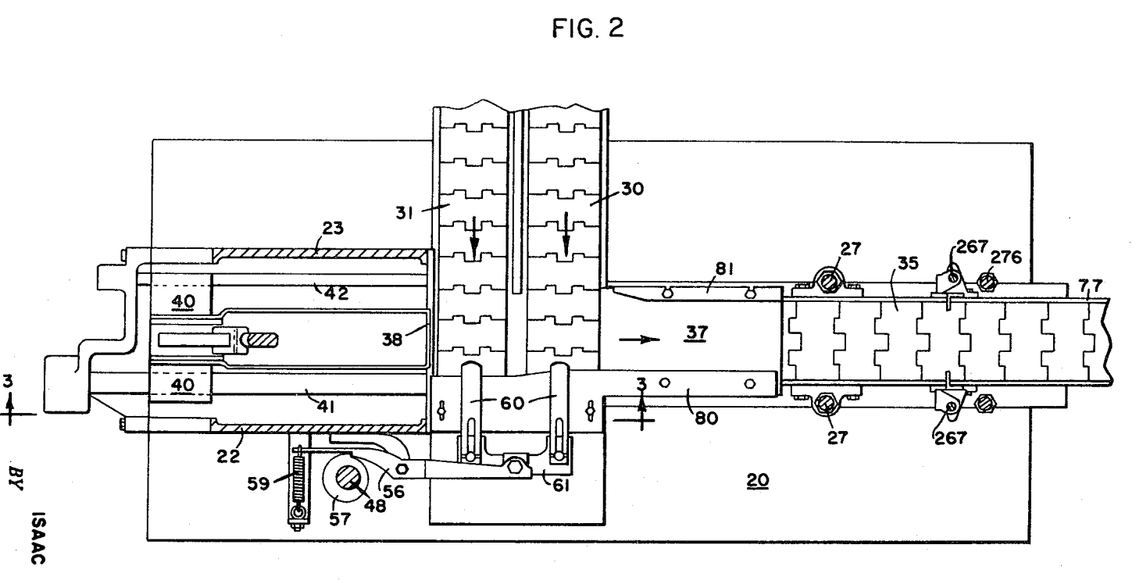
FIGURE 2 is a view taken on line 2—2, FIGURE 1.
Figures 3, 15:
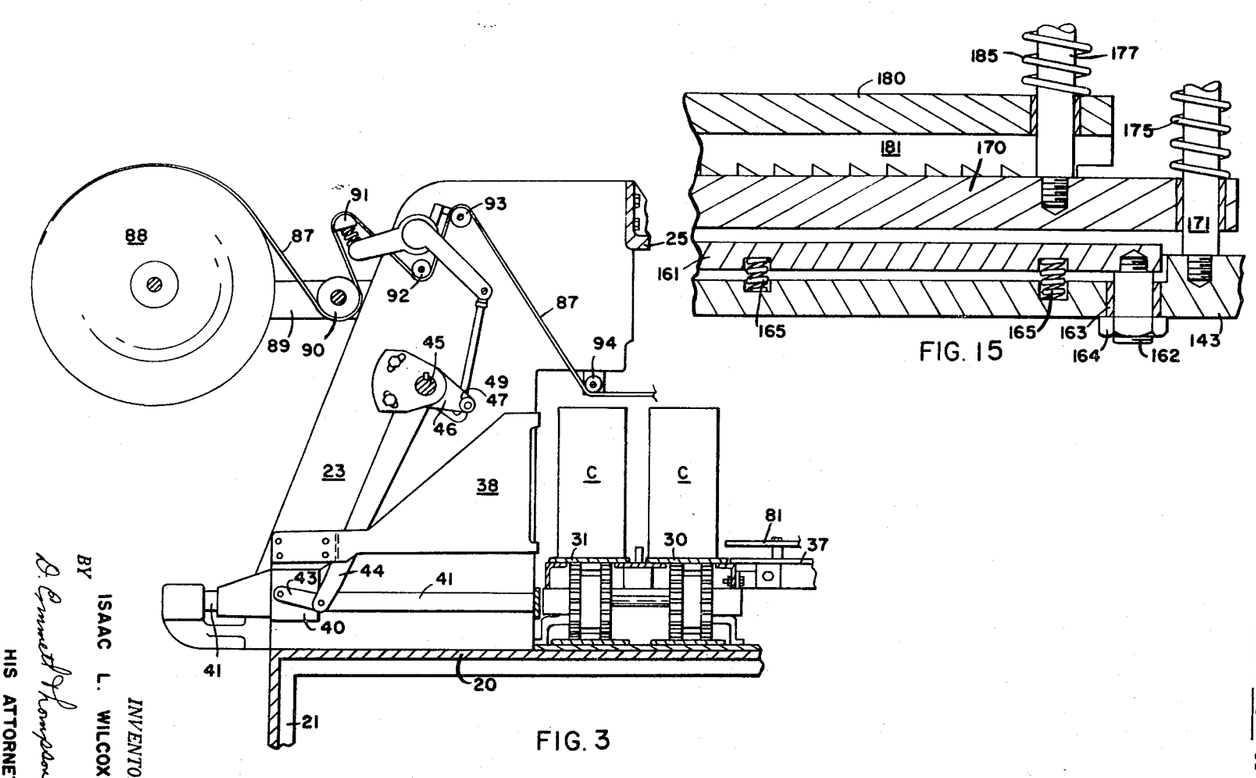
FIGURE 3 is a view of the left portion of the machine shown in FIGURES 1 and 2, the view being taken on a line corresponding to line 3—3, FIGURE 2.
FIGURE 15 is a partial sectional view taken on line 15—15, FIGURE 10.
Figures 4, 17:
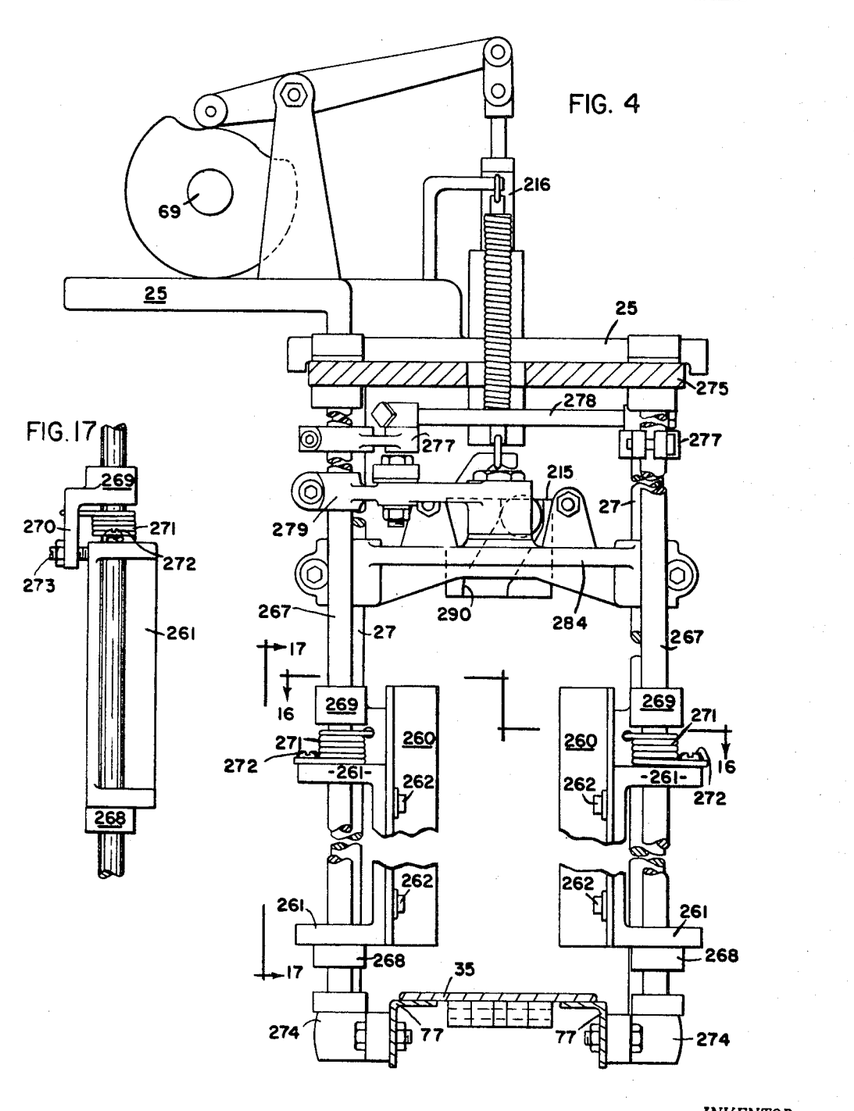
FIGURE 4 is an end elevational view looking to the left, FIGURE 1, with parts omitted.
FIGURE 17 is a view taken as indicated by line 17—17, FIGURE 4.

The machine proper is supported on a framework comprising a top plate 20 supported by legs 21. A pair of vertically disposed side members 22, 23, are fixedly secured to the plate 20 at the rear end thereof, as shown in FIGURES 1, 2 and 3. A supporting plate structure 25 extends forwardly from the upper edges of the plates 22, 23. The forward end of the plate structure 25 is supported by posts 27 extending upwardly from the base plate 20.

In-feed conveyors 30, 31, see FIGURE 2, function to advance pairs of containers C in position in front of the side members 22, 23. A single file conveyor 35 extends forwardly from the machine and functions to advance pairs of containers to which a tape handle has been applied, as will be more fully hereinafter explained.

A pair of containers on the conveyors 30, 31, positioned in front of the side members 22, 23, are advanced onto a fixed plate 37 by a pusher 38. The pusher 38 is formed of sheet metal having spaced apart side portions, the rear ends of which are fixedly secured to a slide 40, the slide being mounted for reciprocation on guide rods 41, 42, fixedly mounted in the side members 22, 23, see FIGURES 2 and 3. A link 43 is pivotally attached at one end to the slide 40, and at its opposite end to a link 44 which is adjustably secured to a shaft 45 journalled transversely in the side members 22, 23, and to an arm 46 having a roller 47.

A main drive shaft 48 is vertically journalled in bearings 49, 50, attached to the outer side of the side member 22, see FIGURE 1. The shaft 48 is rotated by motor 51 mounted on a shelf 52, FIGURE 1, supported by the legs 21 of the frame structure. The shaft 48 is operatively connected to the output shaft 53 of a speed reducer 54 constituting a part of the motor 51 through the instrumentality of a one-revolution clutch 55. This clutch is engaged by moving a trip arm 56 out of engagement with a restraining member 57 in the manner conventional with one-revolution clutches. The arm 56 is normally maintained in latching engagement with the member 57 by spring 59. The arm is moved out of latching position by the pair of containers on the conveyors 30, 31, engaging arms 60 constituting part of a whipple tree arrangement 61 pivotally mounted on the forward end of the trip arm 56, see FIGURE 2. Accordingly, when a pair of containers engage the two arms 60, the arm 56 is moved out of latching position, permitting the shaft 48 to make one revoltuion.

A cam 63 is fixedly secured to the shaft 48, and a portion of the periphery of the cam extends through a slot formed in the side member 22, so that the roller 47, FIGURE 3, rides in the cam slot 64. When the cam 63 is rotated, the arm 44 is swung forwardly, effecting forward movement of the pusher 38, as will be obvious. This forward movement of the pusher 38 advances the pair of containers C from the position in FIGURES 1 and 3, onto the fixed or dead plate 37, as shown at C', FIGURE 1. This operation takes place during the initial part of the rotation of the cam 63.

A jack shaft 65 is operatively connected to the shaft 48 by miter gears arranged in the housing 66 fixed to the side plate 22. The forward end of the jack shaft 65 carries a spur gear 67 arranged in mesh with a similar gear 68 mounted on cam shaft 69, which is journalled in bearings 70, 71, mounted on the top supporting plate 25. The endless conveyor chains 30, 31, are trained over sprockets 73 journalled in suitable brackets mounted on the frame plate 20, the sprockets being driven continuously by a gear reduction motor 74 also mounted on the shelf 52. The single file out-feed conveyor 35 is trained about a sprocket 75 journalled in a bearing member 76 carried by the side rails 77 of the conveyor 35, the rear ends of which are fixedly secured to the bracket in which the in-feed sprocket 73 is journalled. The conveyor 35 extends forwardly from the machine to a discharge point where a motor is mounted for operating the conveyor continuously.

The pair of containers C, as they are moved forwardly by the pusher 38, are guided by lower guide members 80, 81, mounted on opposite sides of the dead plate 37. There are upper guides 83, see FIGURES 1 and 13, secured intermediate their ends to the posts 27.

While the pair of advanced containers, indicated at C', are positioned on the fixed plate 37, a handle of thin sheet material is heat-sealed to the containers of the pair, as disclosed in Patent No. 3,114,496. The web of sheet material is indicated at 87. It is taken from a supply roll 88 journalled in brackets 89 extending rearwardly from the side members 22, 23. The web is fed under an idler roll 90 over a slack former 91, under a second idler roll 92, and over a third roll 93. The web 87 then moves downwardly about a roll 94 and thence forwardly between a feed roll 95 and a pressure roll 97, see FIGURE 10–13.

The feed roll 95 is fixed to a shaft 98 journalled in depending arms 99 of a bracket 100 fixedly secured to the upper plate 25, as by cap screws 101. A ratchet wheel 103 is fixed to one end of the shaft 98 and is engaged by a pawl 104 carried by an arm 105 journalled on the outer end of the shaft 98. The free end of the arm 105 is pivotally connected by a ball joint to a rod end 107 adjustably fixed to the push rod 108, the upper end of which is provided with a clevis 109 pivotally connected to a lever 110, pivotally mounted, intermediate its ends, at 111 to a bracket 112 extending upwardly from the top plate 25, see FIGURE 12. The opposite end of this lever is provided with a roller 113 operable in a cam track 114 of a cam 115 fixed to the cam shaft 69. The arrangement is such that upon downward movement of the rod 108, the feed roll 95 is rotated to feed forwardly a predetermined length of the web 87 from which the handle is formed.

Figure 10:
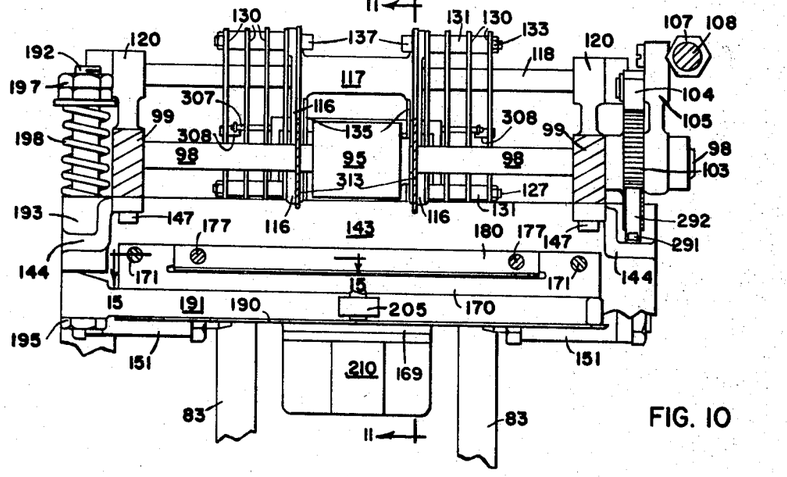
FIGURE 10 is a view taken on line 10—10, FIGURE 9.
Figure 11:
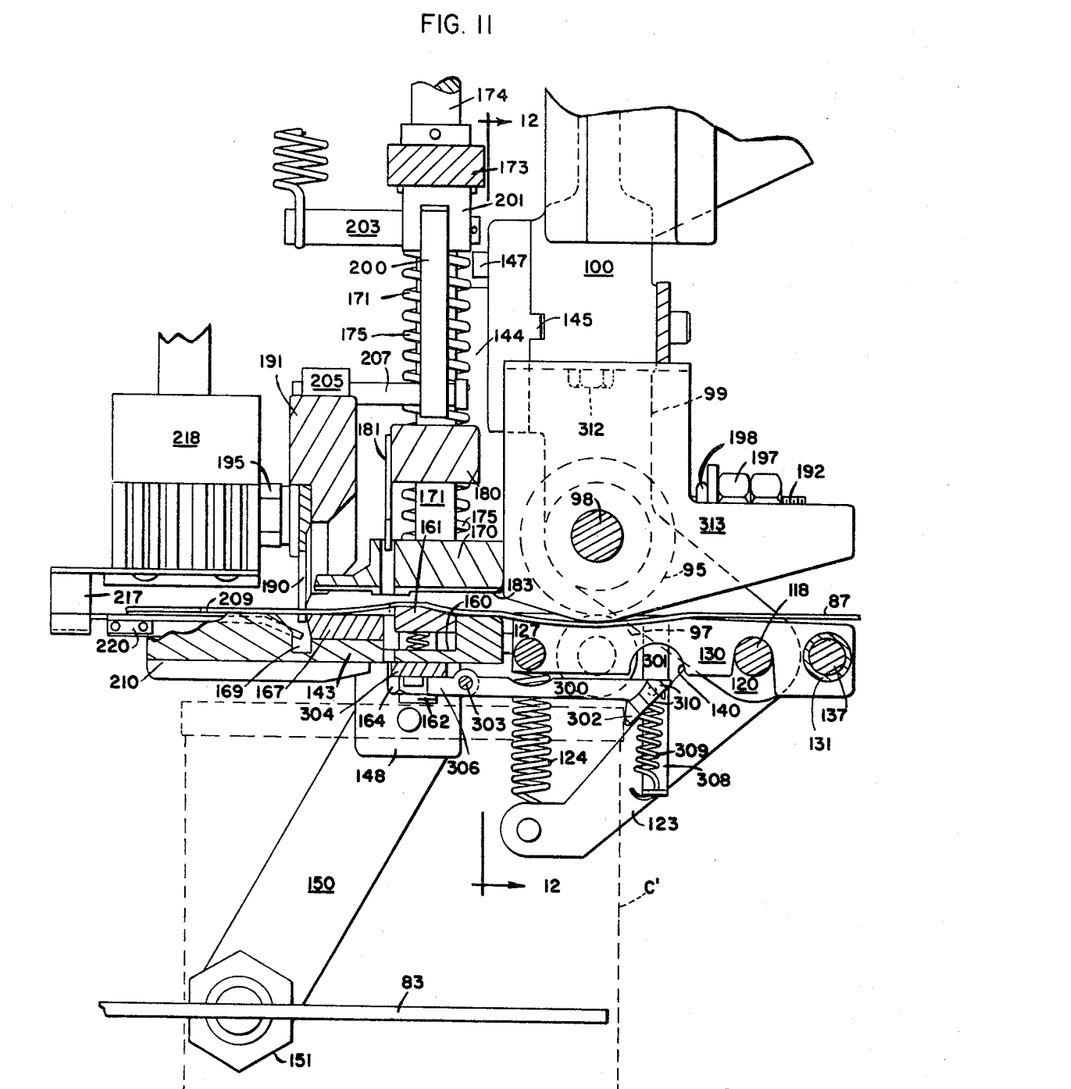
FIGURE 11 is a view taken on line 11—11, FIGURE 10.
Figure 13:
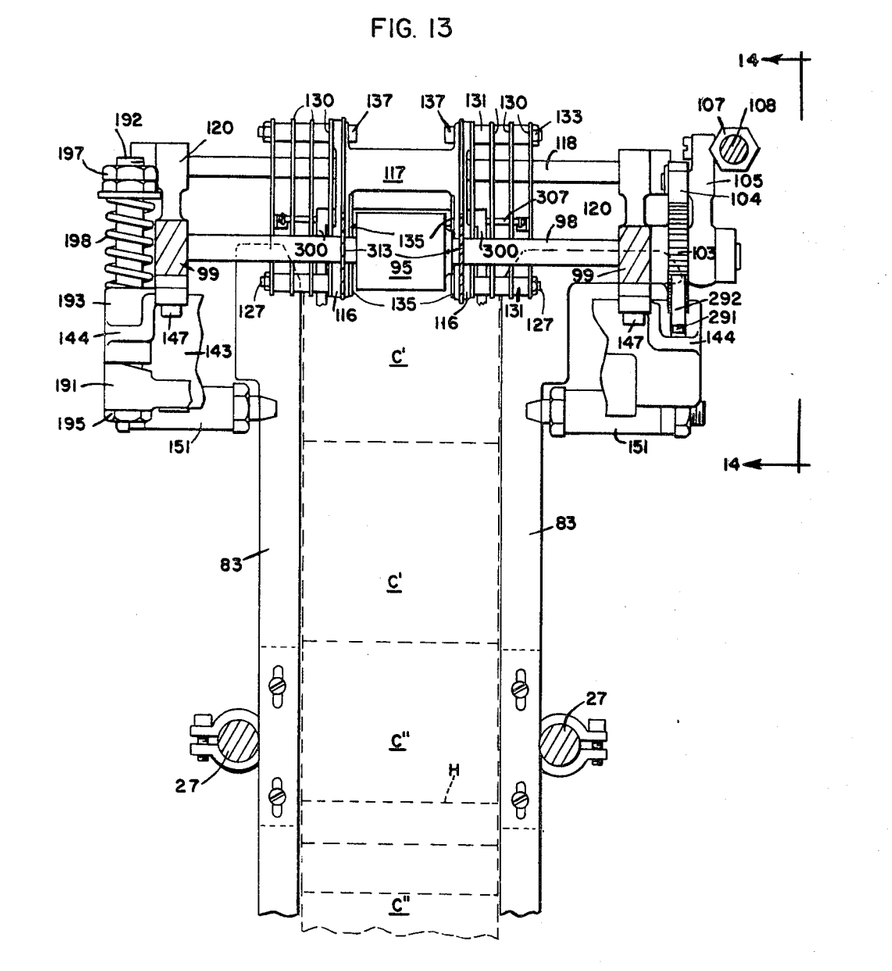
FIGURE 13 is a view taken on a line corresponding to line 13—13, FIGURE 12.

The pressure roll 97 is journalled on a shaft mounted in arms 116 extending forwardly from a hub 117 fixedly secured on a shaft 118 journalled in arms 120 extending downwardly and rearwardly from the arms 99 of bracket 100, see FIGURES 10, 11 and 13. An arm 123 is fixedly secured to one end of the shaft 118 and is urged upwardly by a tension spring 124 which effects upward movement of the arms 116 carried by the hub 117 to yieldingly press the pressure roll 97 against the web 87, and the latter against the feed roll 95.

Bolts 127 are secured in the forward ends of the arms 116 and extend laterally therefrom. A series of guide plates 130 are apertured to receive the bolts 127 and are maintained in spaced apart relation by spacers 131, the assembly being rigidly secured to the arms 116 by nuts 133, see FIGURES 12 and 13. There is also a short guide plate 135 positioned at each end of the pressure roll 97 and secured underneath the heads of the bolts 127.

Similar bolts 137 are positioned in the rear end of the arms 116 for securing the rear ends of the guide plates 130. The guide plates 130 are formed with notches to receive the shaft 118, see FIGURE 11, on which the hub 117 is mounted. These plates are also formed with notches 140 forwardly of the shaft 118 to permit operation of a container latch which will be referred to hereinafter.

Figure 12:
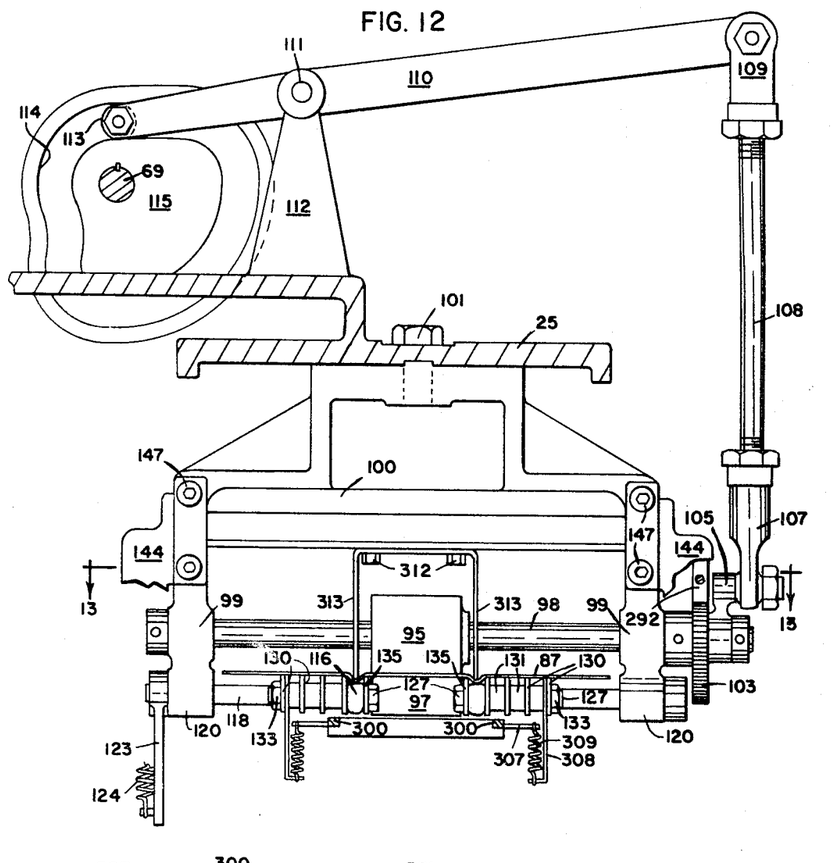
FIGURE 12 is a view taken on line 12—12, FIGURE 11, with parts broken away.

As the web is fed forwardly from between the rolls 95, 97, it passes over a plate 143. This plate is formed with upwardly extending arms 144, the upper ends of which are formed with gibs 145 positioned in horizontally disposed slots formed in the bracket 100. The arms 144 are affixed to the bracket by cap screws 147. In FIGURE 12, the arms 144 are broken off to better illustrate the web feeding and guiding structure. The plate 143 is formed with depending bosses 148 to which are secured, by cap screws 149, braces 150. These braces incline downwardly and forwardly, and carry members 151 which are attached to the rear ends of the upper guide members 83, see FIGURES 1, 11 and 13.

The plate 143 is formed with a transversely extending slot 160 in which a bar 161 is mounted, see FIGURES 11 and 15. A stud 162 is fixedly secured to each end of the bar 161 and is slidably mounted in a bushing 163 in the plate 143. These studs 162 are provided with nuts 164. The confronting surfaces of the plate 143 and bar 161 are formed with aligned recesses in which compression springs 165 are mounted. The length of the studs 162 is such that the springs 165 normally maintain the upper surface of the bar 161 above the plane of the top surface of the plate 143.

The plate 143 is also formed, forwardly of the slot 160, with a transversely extending recess of less depth in which a bed knife 167 is mounted, and forwardly of the bed knife 167, the plate 143 is formed with a deeper recess 169.

Figure 9:
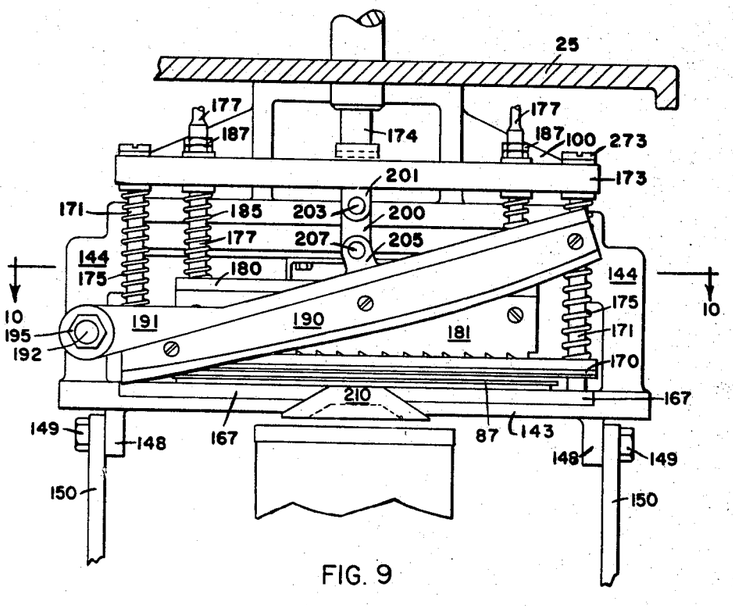
FIGURE 9 is a view taken on line 9—9, FIGURE 1.

A presser foot 170 is carried by a pair of studs 171, see FIGURE 9, which are slidably mounted in and depend from a bar 173 fixed to the lower end of a push rod 174. The studs 171 are encircled by compression springs 175. Upon downward movement of the push rod 174, the presser foot 170 is moved downwardly into engagement with the web 87, depressing the bar 161 against the action of the springs 165.

There is a second pair of studs 177 slidably mounted in and depending from the bar 173. A bar 180 is secured to the lower ends of the studs 177 and carries a perforating blade 181. The lower edge of this blade is formed with saw teeth and, upon continued downward movement of the bar 173, the springs 175 are compressed and the perforating blade 181 is moved into the slot between the bar 161 and the bed knife 167. The length of the blade 181, extending transversely of the web 87, is less than the width of the web, and serves to form a series of slits in the web. During penetration of the web by the blade 181, the web is firmly clamped against the upper surface of the bar 161 and the upper surface of the bed knife 167, by the presser foot 170. Preferably, the under surface of the presser foot 170 is provided with a layer of rubber, or other yieldable material, as indicated at 183, FIGURE 11. The studs 177 are encircled by compression springs 185. Nuts 187 are carried by the studs 177 and serve to limit the downward movement of the bar 180 and blade 181 relative to the bar 173. The purpose of the springs 185 is to permit the studs 177, which extend upwardly through the top plate 25, to be locked in up position so that, upon downward movement of the bar 173, the springs 185 are compressed but bar 180 and blade 181 do not move downwardly. The arrangement for locking up the studs 177 is more particularly described in the Patent No. 3,306,802.

Actuation of the feed roll 95 by the push rod 108, advances the web 87 a predetermined distance to form a handle band for application to a pair of the containers C' positioned on the dead plate 37. Simultaneously, with the descent of the perforating blade 181, if it is used, the forward extending portion 209 of the web is severed by a knife 190 fixed to a bar 191 pivotally mounted, at one end, on a rod 192 journalled in a boss 193 formed integral with one of the depending arms 144, see FIGURES 1, 9 and 10. The rod 192 is provided at its forward end with a nut 195 abutting the knife bar 191, and with nuts 197 at its rear end. A compression spring 198 is mounted on the rod intermediate the boss 193 and the nuts 197. This arrangement maintains the knife 190 in close shearing engagement with the bed knife 167. A link 200 is pivotally connected to a U-shaped member 201 fixed to the bar 173. This pivotal connection includes an elongated pin 203. The lower end of the link 200 is pivotally connected to a boss 205 by an elongated pin 207, see FIGURES 9 and 11. The boss 205 is formed integral with the knife bar 191. In FIGURES 9 and 11, the parts just described, including the presser foot 170, perforating blade 181, and the knife blade 190, are shown in the up position. When the bar 173 is moved downwardly, the necessary over-travel of the push rod 174, to move the knife all the way down to sever the web, is permitted by compression of the springs 175. With this severance, the forward portion of the web, indicated at 209, FIGURE 9, is positioned on a gable roof projecting portion 210 formed integral with plate 143 and the severed portion 209 is clamped against the gable projection 210 by a member 213, which is carried by and extends rearwardly from a cam block 215 fixed to the lower end of a push rod 216, see FIGURES 1 and 5.

Figures 7, 8:
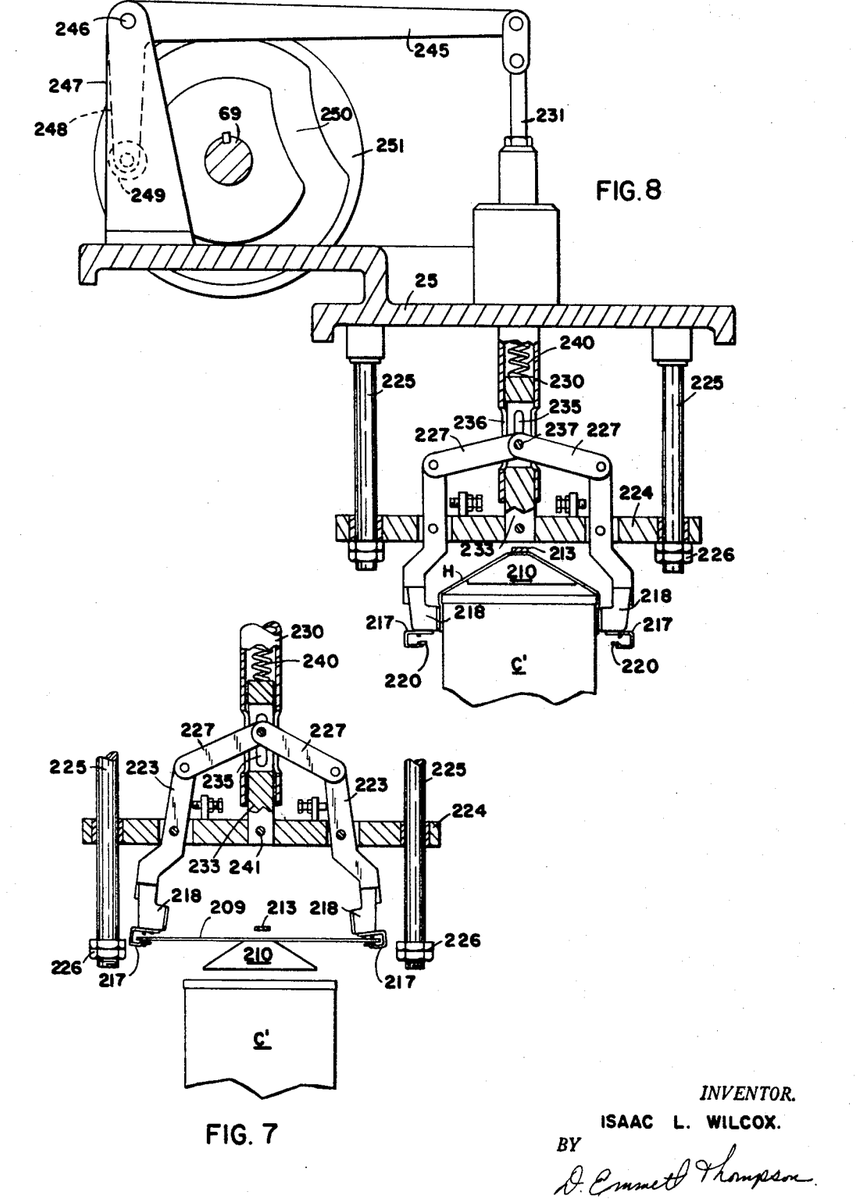
FIGURE 7 is a view taken on line 7—7, FIGURE 1, showing the sealing jaws in up-tape receiving position.
FIGURE 8 is a view, similar to FIGURE 7, showing the sealing jaws in down-sealing position and including the jaw operating cam.

The film clamp 213 is moved downwardly to clamp the severed portion 209 against the gable member 210 during the operation of the knife 190. As the web is fed forwardly, the end portion 209 is moved into guide members 217 secured to sealing jaws 218. These guide members 217 is U-shaped, or of channel formation, with the open sides of the channels facing inwardly toward the containers C', as illustrated in FIGURES 7, 8 and 11. There is a leaf spring member 220 fixed to the lower flange of each of the guide members 217. The free ends of these spring members face rearwardly and terminate at the slot 169 and are bent slightly downwardly, as shown in FIGURE 11. The guides 217 receive the opposite side edges of the portion 209, and serve to center the severed portion 209 relative to the containers C' and, in conjunction with the clamp member 213, serve to keep the severed portion 209 in proper position until it is applied to the pair of containers C' by the heated jaws 218, as shown in FIGURE 8.

The jaws 218 are fixed to the lower ends of links 223 pivotally mounted intermediate their ends to a cross bar 224 slidably mounted on guide rods 225 depending from the top wall 25. Nuts 226 at the lower end of the guide rods 225 serve to limit the downward movement of the cross bar 224.

The upper ends of the links 223 are pivotally connected to links 227. The lower portion 230 of a push rod 231 is of tubular formation. A plunger 233 is slidably mounted in the end portion 230 and the plunger is formed with an axially extending slot 235. The lower portion 230 is also formed with an axially extending slot 236. The inner ends of the links 227 extend inwardly through the slot 236 and are joined together by a pin 237 which is positioned in slot 235 of the plunger 233, and the ends of the pin are positioned in apertures in the push rod end 230. A compression spring 240 acts against the plunger 233 to urge it downwardly relative to the end portion 230, as shown in FIGURE 7. The cross bar 224 is fixedly secured to the lower end of the plunger, as by pin 241. With this arrangement, as the push rod 230 is moved downwardly, the jaws 218 and the bar 224 are moved downwardly until the bar engages the nuts 226. Continued downward movement of the push rod thereafter results in the pin 237 being moved downwardly in the slot 235. The links 227 constitute a toggle, as will be obvious, and this downward movement of the pin 237 causes the links 223 to effect inward movement of the jaws 218 to iron the ends of the severed piece 209 against the sides of the pairs of containers and heatseal the ends of the portion 209 to the containers. Initial upward movement of the push rod 231 first effects an outward swinging motion to the jaws 218 and then raises them to the up position shown in FIGURE 7. The upper end of the push rod 231 is connected to an angle arm 245 pivoted on a pin 246 carried by a bracket 247 mounted on the top wall 25. The depending leg 248 is provided with a roller 249 positioned in a cam track 250 formed in a cam wheel 251 keyed to the cam shaft 69. The jaws 218 are provided with electric heaters to maintain the jaws at proper sealing temperature.

The applied handle band is indicated at H, FIGURE 8. Referring again to FIGURE 1, it will be remembered that the pusher 38 advanced a pair of containers C from the in-feed conveyor 30, 31, onto the dead plate 37, as indicated by containers C'. After the application of the handle band H to the pair of containers C' on the dead plate 37, the pusher 38 advances another pair of containers C from the conveyors 30, 31. These containers C engage the pair C' and move them forwardly off from the dead plate onto the out-feed conveyor 35. The pair of containers with the handle band H applied are indicated at C'', FIGURE 1, and this pair are stopped by engagement with a pair of container stops in the form of gates 260 mounted above the out-feed conveyor 35 and forwardly thereof a distance occupied by a pair of containers, see FIGURES 1, 4, 5 and 6.

The gates 260 are in the form of vertically disposed angle irons attached to U-shaped members 261, as by screws 262. During the application of the handle band H to the pair of containers C' positioned on the dead plate, the gates 260 are in closed position, as indicated in full line, FIGURE 4, and in dotted line at 263, FIGURE 5. The U-shaped members 261 are mounted on vertically disposed shafts 267 and have limited rotation relative to the shafts. The U-shaped members 261 are positioned vertically by collars 268 fixed to the shafts 267.

Figure 16:
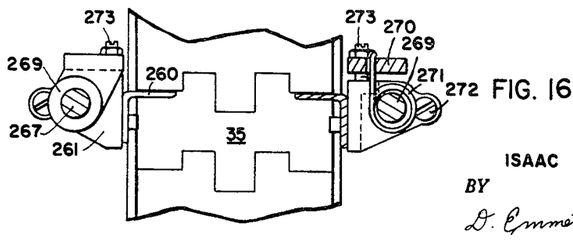
FIGURE 16 is a view taken on line 16—16, FIGURE 4.

An actuating member having a hub portion 269 is keyed to each of the shafts 267 and there is a depending flange 270 terminating at its lower edge in juxtaposition to the upper end of each U-shaped member 261. A torsion spring 271 is mounted on each shaft 267 intermediate the upper end of the U-shaped member 261 and the hub portion 269 of the actuating member. One end of the spring is attached to the upper flange of the U-shaped member, as by a screw 272. The opposite end of the spring extends through an aperture in the flange 270 of the actuating member. The flange 270 is provided with an adjustable stop screw 273, see FIGURES 16 and 17. With this arrangement, the springs 271 maintain the U-shaped members 261 yieldingly against the stop screws 273.

The lower ends of the shafts 267 are journalled in bearings 274 secured to the side frame members 77 of the out-feed conveyor 35. The upper ends of the shafts 267 are journalled in a plate 275, see FIGURES 1 and 4. The plate 275 extends forwardly from the top plate 25 and is supported at its forward end by posts 276 extending upwardly from the frame plate 20. Arms 277 are fixedly clamped to the upper end portions of the shafts 267 and are connected together by a tie bar 278, see FIGURES 4 and 6, whereby the shafts 267, when oscillated, are oscillated in unison. An arm 279 is fixed to one of the shafts 267 and is pivotally connected to a link 280 extending rearwardly and which, at its rear end, is pivotally connected to an arm 281 having a hub portion 282 journalled on a stud 283 carried by a plate 284 fixedly secured to the posts 27.

Figure 5:
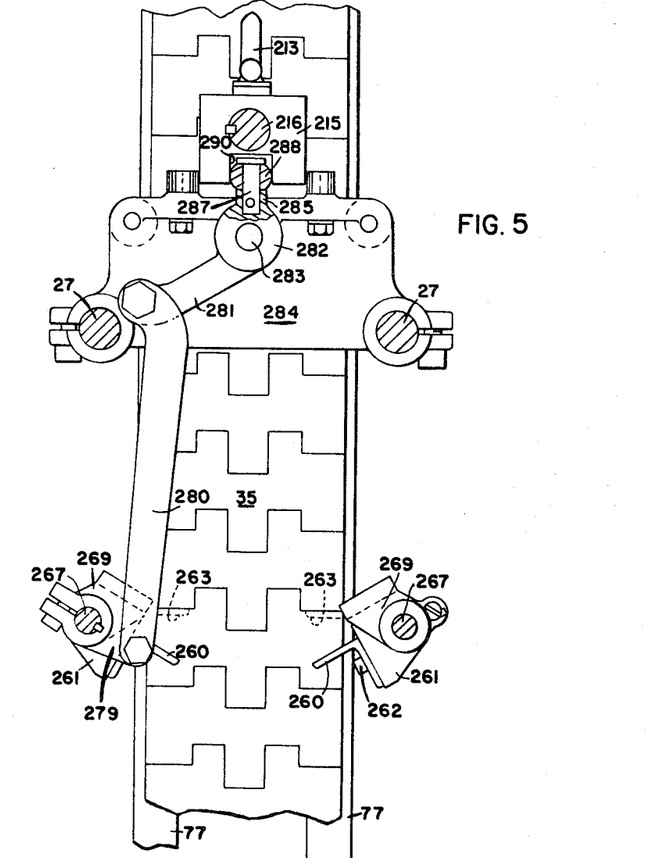
FIGURE 5 is a view taken on line 5—5, FIGURE 1.
Figure 6:
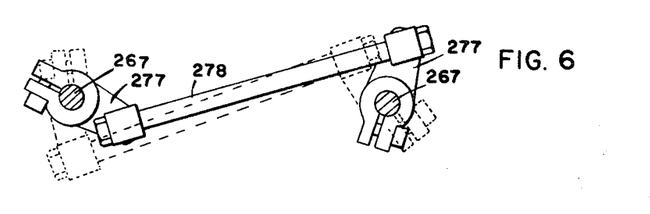
FIGURE 6 is a view taken on line 6—6, FIGURE 1.

There is a boss 285 extending rearwardly from the hub portion 282, see FIGURE 5. A pin 287 is fixed in the boss 285 and carries a spherical roller 288. The roller 288 is positioned in a cam groove 290 formed in the cam block 215, see FIGURES 4 and 5. With this arrangement, when the cam block is reciprocated vertically by the push rod 216, the linkage described effects oscillation of the shafts 267 to move the gates 260 into and out of container engaging position. In FIGURE 5, the gates are shown in full line intermediate, closed and open position. As previously stated, dotted line indication 263 shows the gates in closed position.

Figure 14:
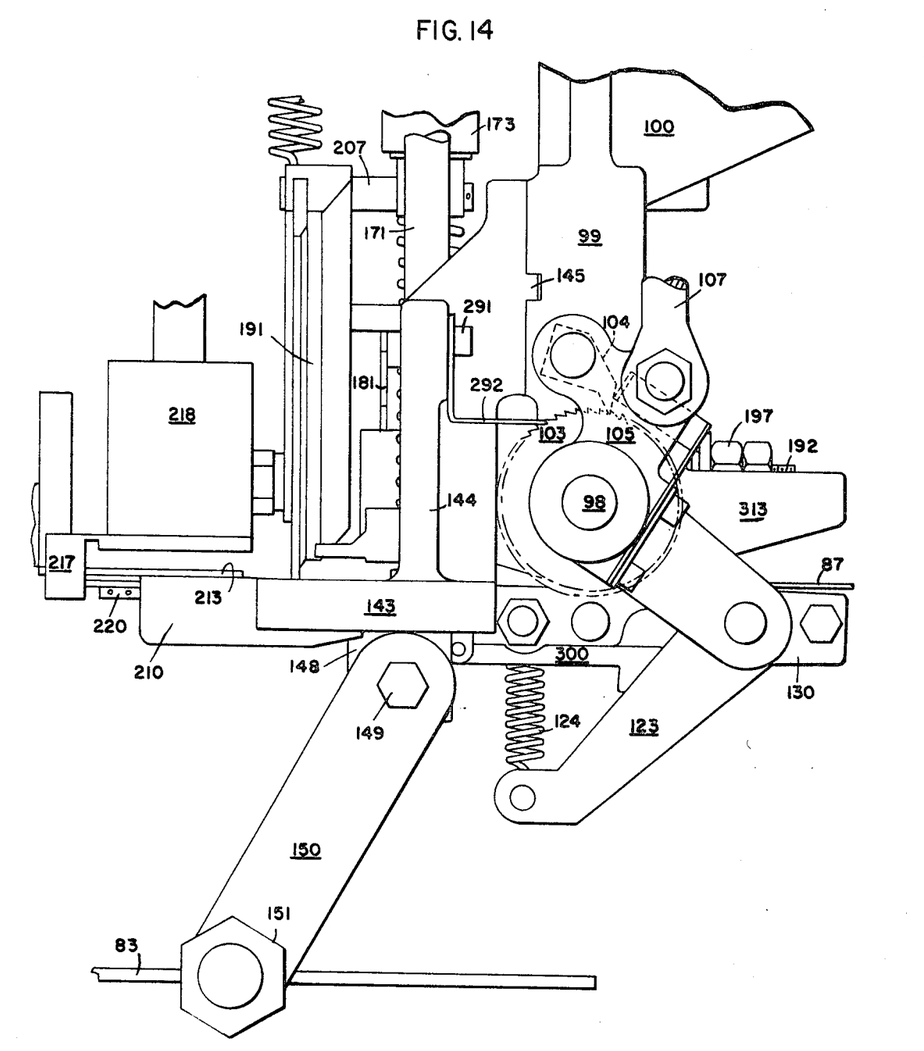
FIGURE 14 is a side elevational view taken as indicated by line 14—14, FIGURE 13.

The sequence of operation is as follows: When two containers C are moved into engagement with the arms 60, to trip the clutch 55, the pusher 38 starts forwardly. Simultaneously, the feed roll 95 is actuated by the push rod 108. A leaf spring 292 is fixed to one of the arms 144, as by screw 291. The free end of the spring 292 engages the periphery of the ratchet wheel 103, see FIGURE 14, to prevent retrograde rotation of the ratchet wheel and feed roll 95 upon upward movement of the push rod 108. The web 87 is fed forwardly the desired distance before the advancing containers come to rest on the dead plate 37. The gates 260 are moved to closed position by the descent of the cam block 215. As previously explained, the gate supporting members 261 are spring connected to the shafts 267. This permits an over-run, or slightly further downward movement, of the cam block 215 after the gates have been moved to full closed position. The web clamp 213 is moved against the served end portion 209 upon the cessation of advancement of the tape. Immediately thereupon, the perforating blade 81 and the knife 190 descend, severing the forward portion 209 from the web. Immediately thereafter, the jaws 218 move downwardly and inwardly to seal the ends of the severed tape to the pair of containers C′ to form the handle H. This sealing takes place instantaneously due to the fact that the jaws 218 are heated, and thereupon, the push rod 231 is moved upwardly, swinging the jaws 218 outwardly and upwardly and simultaneously, with the upward movement of the jaws 218, the cam block 215 moves upwardly, first moving the clamp 213 out of engagement with the now applied handle H and, upon further upward movement, causes the gates 260 to swing open.

If a second pair of containers have tripped the clutch 55, the pusher now starts forwardly and, as previously explained, this new pair of containers C engage and push forwardly the pair of containers C′ which have had the handle applied, these containers being moved to the position shown at C″, FIGURE 1, against the stop gates 260. The cycling of the machine is repeated and the handle band is applied to the second pair of containers. The next tripping of the clutch 55 results in the second pair of containers on the dead plate being moved forwardly and because the gates 260 are then opened, the containers at C″ are moved forwardly and are taken away by the out-feed conveyor 35. The timing is such that the gates 260 re-close prior to the time that the containers C′ are advanced to the gates.

When the machine is initially started up, it is desirable to stop advancement of the first pair of containers by the pusher 38 manually, as by inserting the finger over the forward end of the dead plate 37. Thereafter, the operation of the machine is completley automatic because the first pair of containers to which the handle has been applied will, upon the next cycling of the machine, be advanced against the stop gates 260, and the pair of containers C″ stopped by the gates forms a stop for the advancement of the pair of containers moved onto the dead plate with the juncture between that pair of containers located centrally beneath the severed portion 209 of the web, and also centrally of the jaws 218. It will, of course, be understood that the length of the severed portion 209 provides sufficient width to the applied handle so that the handle is applied to the upper portions of the opposite sides of the abutting containers C′ on the dead plate. In other words, the handle H is sealed evenly to both of the containers of the pair.

Figure 18:
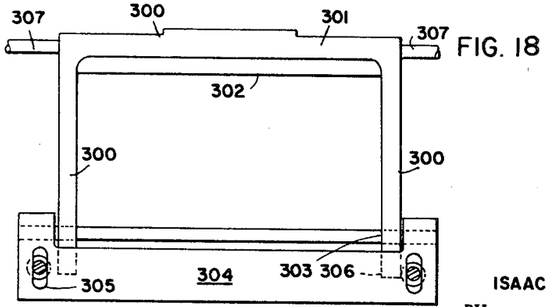
FIGURE 18 is a top plan view of the container latch structure.

In order to space the pair of containers C′ positioned on the dead plate 37 in proper alignment with the sealing jaws during the application of the handle band, a latch is provided to engage the top rear edge of the second, or rear container of the pair. This latch consists of a pair of spaced apart legs 300 connected at like ends to a transversely extending portion 301 formed with a depending latch 302. The legs 300 are pivotally mounted, as at 303, at their opposite ends to a bracket 304. The bracket is fixed to the under side of the plate 143, see FIGURE 11, as by screws extending through holes 305 in the bracket, see FIGURE 18, and threaded into the plate 143. The legs 300 have projections 306 extending forwardly from the pivots 303 and engaging the under side of the bracket to limit downward movement of the latch to the position shown in FIGURE 11. The latch is provided with pins 307 extending laterally from the portion 301. The leg portions 300 of the latch are located intermediate the inner pair of web guide plates 130, see FIGURES 10 and 13. The outer guide plates 130 are provided with depending brackets 308. A tension spring 309 is interposed between the lower ends of the brackets 308 and the outer ends of the pins 307, the springs 309 yieldingly urging the latch to down position, as shown in FIGURE 11. The rear side of the portion 301 of the latch is inclined downwardly and forwardly, as at 310. As the containers are advanced onto the dead plate, the latch is cammed upwardly by the inclined surface 310. The pair of containers C′ are compressed against the pair of containers C″ positioned against the stop gates 260. This compression is sufficient to move the rear top edge of the second container of the pair C′ forwardly of the latch ledge 302, whereupon this ledge moves downwardly behind the top edge of the second container C′. With this arrangement, the pair of containers C′ on the dead plate are held in close abutting relation while the handle band is applied.

There is an upper U-shaped web guide attached to the bracket 100, as by screws 312, see FIGURE 12. This guide plate has depending side flanges 313, the lower edges of which are positioned between the inner lower guide plates 130 and the shorter guide plates 135. This arrangement provides for drawing the web transversely under slight tension to provide proper engagement of the center portion of the web by the feed roll 95 and the pressure roll 97. This arrangement also aids in advancing the web in a straight line normal to the axis of the feed roll 95.

What I claim is:

1. A machine for applying handle bands of sheet, heat-sealable material to pairs of containers arranged in upstanding side by side abutting relation comprising a frame, a plate fixedly mounted in the frame and being of sufficient dimension to support at least one pair of said containers in upstanding side by side abutting relation, a constantly running out-feed conveyor extending in a direction outwardly from said plate, a container stop member positioned above said out-feed conveyor and being movable into and out of container stopping position, means mounted above said plate and operable to heat-seal a handle band of sheet heat-sealable material to a pair of containers positioned on said plate, container advancing means operable to advance said pair of containers to which said handle band has been applied to said out-feed conveyor, and means operable subsequent to the application of said handle band to said pair of containers to move said container stop member out of container stopping position, whereby said out-feed conveyor is then operable to advance pairs of containers in a direction away from said plate.

2. A machine for applying a handle band of sheet, heat-sealable material to a pair of containers rectangular in cross section and arranged in upstanding side by side abutting relation comprising a frame, a fixed plate, a container pusher, a container in-feed conveyor operable to advance a pair of containers in juxtaposition to said pusher, said pusher being operable to push said pair of containers onto said plate, a continuously running out-feed conveyor extending outwardly from said plate in the direction the containers are advanced by said pusher, container stop means positioned above said out-feed conveyor and forwardly of said plate a distance equal to at least one pair of containers, said stop means being movable into and out of container stopping position, means operable to heat-seal a handle band of said sheet, heat-sealable material to a pair of containers positioned on said plate, means operable subsequent to the application of said handle band to said pair of containers to move said container stop means out of container stopping position, whereby a pair of containers positioned on said out-feed conveyor between said plate and said stop members are advanced by said out-feed conveyor.

3. A machine for applying a handle band of sheet, heat-sealable material to a pair of containers arranged in upstanding side by side abutting relation comprising a frame, a plate fixedly mounted in the frame for supporting a pair of containers, a container pusher, a container in-feed conveyor operable to advance a pair of containers in juxtaposition to said pusher, said pusher being operable to advance said pair of containers onto said plate, a continuously running single file out-feed conveyor extending outwardly from said plate in the direction the containers are advanced by said pusher, container stop means positioned above said out-feed conveyor and forwardly of said plate a distance equal to at least one pair of containers, said container stop means being movable into and out of container stopping position, means operable to heat-seal a handle band of said material to a pair of containers positioned on said plate, stop actuating means operable subsequent to the application of said handle band to said pair of containers positioned on said plate to move said container stop means out of container stopping position, whereby a pair of containers positioned on said out-feed conveyor between said plate and said stop means are advanced by said out-feed conveyor.

4. A machine for applying a handle band to thin, heat-sealable sheet material to a pair of containers rectangular in cross section and arranged in upstanding side by side abutting relation, a plate positioned above the pair of containers, a web shear mounted at the downstream end of said plate, a support positioned forwardly of said shear above the junction between said pair of containers, web feed means operable to advance said web over said plate and position the end portion of the web on said support, a heat sealing jaw positioned at each side of said support, said jaws being provided with guide members for receiving the ends of the end portion of said web positioned on said support, means for operating said shear to sever said end portion of the web, and jaw actuating means operable to move said jaws downwardly to press the ends of said severed end portion of the tape into heat-sealing engagement with the opposite sides of said pair of containers at the juncture therebetween.

5. A machine for applying a handle band of thin, heat-sealable sheet material to a pair of containers rectangular in cross section and arranged in upstanding side by side abutting relation, a plate positioned above the pair of containers, a shear mounted at the downstream end of said plate, web feed means at the upstream end of said guide plate and operable to feed a web of said heat-sealable sheet material over said plate and past said shear, a perforating blade mounted intermediate said web feed means and said shear and being movable downwardly into engagement with the web on said plate to perforate the same, and means operable upon upward movement of said perforating blade to move said web upwardly from said plate.

6. A machine for applying a handle band of thin, heat-sealable sheet material to a pair of containers rectangular in cross section and arranged in upstanding side by side abutting relation, a plate positioned above the pair of containers, a shear mounted at the downstream end of said plate, web feed means at the upstream end of said plate and operable to feed a web of said heat-sealable sheet material over said plate and past said shear, said plate being formed in its upper surface with a slot extending transversely of said web, a perforating blade mounted intermediate said web feed means and said shear in registration with said slot, and said perforating blade being movable downwardly into engagement with the web on said plate to perforate the same, and means mounted on said plate at the upstream edge of said slot and being operable upon upward movement of said perforating blade to move said web upwardly from said plate.

7. A machine for applying a handle band of thin, heat-sealable sheet material to a pair of containers rectangular in cross section and arranged in upstanding side by side abutting relation, a plate positioned above the pair of containers, a shear mounted at the downstream end of said plate, web feed means at the upstream end of said plate and operable to feed a web of said heat-sealable sheet material over said plate and past said shear, said plate being formed with a slot extending transversely of said web intermediate said web feed means and said shear, a bar mounted in said plate contiguous to the upstream edge of said slot and extending parallel thereto, said bar being movable relative to said plate from a down position in which the upper surface of said bar is co-planar with the upper surface of said plate to up position to elevate said bar above the plane of the upper surface of said plate, a presser foot movable downwardly to clamp said web against said bar and to move the bar to down position, and a perforating blade arranged above said slot and in registration therewith, and being movable downwardly into engagemnet with said clamped web to perforate the same, said bar being movable upwardly upon upward movement of said presser foot.

References Cited

UNITED STATES PATENTS

| | | | |
|---|---|---|---|
| 2,141,212 | 12/1938 | Kimball et al. | 198—24 X |
| 2,881,898 | 4/1959 | Reilly | 198—24 X |
| 2,993,583 | 7/1961 | Sykes | 198—24 X |
| 3,306,802 | 2/1967 | Wilcox et al. | 156—355 |

EARL M. BERGERT, *Primary Examiner.*

T. R. SAVOIE, *Assistant Examiner.*

U.S. Cl. X.R.

156—355, 521; 53—134